(12) United States Patent
Lucash (10) Patent No.: US 9,870,578 B2
(45) Date of Patent: Jan. 16, 2018

(54) SCROLLING INTERSTITIAL ADVERTISEMENTS

(71) Applicant: Google Inc., Mountain View, CA (US)

(72) Inventor: Nathan P. Lucash, San Francisco, CA (US)

(73) Assignee: Google LLC, Mountain View, CA (US)

( * ) Notice: Subject to any disclaimer, the term of this patent is extended or adjusted under 35 U.S.C. 154(b) by 574 days.

(21) Appl. No.: 14/171,371

(22) Filed: Feb. 3, 2014

(65) Prior Publication Data

US 2017/0193566 A1    Jul. 6, 2017

(51) Int. Cl.
*G06F 3/0485* (2013.01)
*G06Q 30/02* (2012.01)

(52) U.S. Cl.
CPC ....... *G06Q 30/0277* (2013.01); *G06F 3/0485* (2013.01)

(58) Field of Classification Search
CPC .......................... G06F 3/0485; G06Q 30/0277
See application file for complete search history.

(56) References Cited

U.S. PATENT DOCUMENTS

| | | | |
|---|---|---|---|
| 6,011,537 A | 1/2000 | Slotznick | |
| 7,904,062 B2 | 3/2011 | Ashkenazi et al. | |
| 8,490,134 B2 | 7/2013 | Gerba et al. | |
| 8,539,359 B2 | 9/2013 | Rapaport et al. | |
| 2001/0056370 A1* | 12/2001 | Tafla | G06F 3/0481 705/14.69 |
| 2007/0294635 A1* | 12/2007 | Craddock | G06F 3/0485 715/784 |
| 2008/0220747 A1* | 9/2008 | Ashkenazi | G06Q 30/02 455/414.1 |
| 2008/0231751 A1* | 9/2008 | Zalewski | H04N 5/147 348/578 |
| 2011/0125594 A1* | 5/2011 | Brown | G06Q 30/02 705/14.73 |
| 2013/0305170 A1* | 11/2013 | de Souza | G06F 3/0485 715/760 |

* cited by examiner

*Primary Examiner* — Jennifer To
*Assistant Examiner* — Ashley Fortino
(74) *Attorney, Agent, or Firm* — Foley & Lardner LLP (57) ABSTRACT

Methods, systems, and apparatus, including computer programs encoded on a computer storage medium, for providing advertisements for initial off-screen insertion over publisher resources. In one aspect, a method includes receiving, from a user device, a request for a content item for presentation with a publisher resource; and providing, to the user device, a content item with instructions that cause the content item to be inserted into the publisher resource at a location at which at least a portion of the content item is not presented by the user device upon initial presentation of the publisher resource, the instructions further causing the content item to be inserted as an overlay relative to content of the publisher resource and to scroll at a different rate than the content of the publisher resource in response to user interaction with a resource scroll control.

17 Claims, 4 Drawing Sheets

SCROLLING INTERSTITIAL ADVERTISEMENTS

BACKGROUND

This specification relates to data processing and content distribution.

The Internet facilitates the exchange of information and transactions between users across the globe. This exchange of information enables content sponsors to provide sponsored content to a variety of users. Sponsored content can be presented to users alongside non-sponsored content. As one example, an advertisement can be presented as an identifiable portion or area on a display screen, for example in form of a banner or a box. A content sponsor can control the distribution of their content items (e.g., promotions, advertisements, audio files, video files, or other content items) based on a set of distribution parameters that specify under what conditions a content item is eligible to be distributed. When a presentation opportunity meeting the conditions is available, the content item is deemed eligible to be provided for presentation.

SUMMARY

In general, one innovative aspect of the subject matter described in this specification can be embodied in methods that include the actions of receiving, from a user device, a request for a content item for presentation with a publisher resource; determining that the publisher resource is eligible for presentation of a scrolling content item; and providing, to the user device and in response to the content item request, a content item with instructions that cause the content item to be inserted into the publisher resource at a location at which at least a portion of the content item is not presented by the user device upon initial presentation of the publisher resource, the instructions further causing the content item to be inserted as an overlay relative to content of the publisher resource and to scroll at a different rate than the content of the publisher resource in response to user interaction with a resource scroll control.

These and other embodiments can each optionally include one or more of the following features. The instructions can further cause the content item to scroll into a position where the content item occludes a majority of a display of the user device in response to user interaction with the resource scroll control. At least part of the content of the publisher resource can be visible through the content item. The instructions can further cause the content item to stop scrolling when an upper edge of the content item reaches a specified location within a display area of the user device while the content of the publisher resource continues to scroll in response to user interaction with the resource scroll control. The instructions can further cause the content item, when at least partially visible, to scroll downward out of the display of the user device at a different rate than the content of the publisher resource in response to another user interaction with the resource scroll control. The instructions can further cause the content item to be positioned relative to the content of the publisher resource according to a location tag of the publisher resource that identifies a location of the publisher resource that is not presented by the user device upon initial presentation of the publisher resource. The instructions can further cause the content item to be positioned relative to the content of the publisher resource based on a determination of an amount of the content of the publisher resource that is to be displayed upon initial presentation of the publisher resource.

The instructions can further cause the content item to be positioned a predetermined distance below a visible portion of the content of the publisher resource that is displayed upon initial presentation of the publisher resource. The predetermined distance can be determined based in part on a size of a display of the user device. Determining that the publisher resource is eligible for presentation of a scrolling content item can include determining that a length of the content of the publisher resource is greater than a predetermined threshold. The predetermined threshold can be determined based in part on a size of a display of the user device. Other embodiments of this aspect include corresponding systems, apparatus, and computer programs, configured to perform the actions of the methods, encoded on computer storage devices.

Particular embodiments of the subject matter described in this specification can be implemented so as to realize none, one or more of the following advantages. Content items can be placed over a portion of a publisher resource that is not visible during initial presentation of the publisher resource so as not to interrupt initial viewing of the publisher resource by a user. Different scroll rates for a content item displayed with a publisher resource can be provided to help indicate to a user viewing the content item that the content item is separate from the publisher resource.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Resource publishers ("publishers") provide content to users in the form of resources (e.g., webpages containing text, graphics, and/or other content) for display on end user devices. For example, a publisher can provide a webpage containing text and pictures related to a news story for display on a personal computer. As another example, a publisher can provide video content for display on a mobile device.

Content sponsors provide content items for display on end user devices alongside or in addition to the resources provided by the publishers. In some implementations, a content distribution system distributes content on behalf of content sponsors. For example, following the first example above, an advertising system can provide a content item in the form of an advertisement that can be displayed alongside a webpage containing text and pictures related to a news story. In some implementations, tags or indicators included with the resource can be used to determine what type of content item to display along with the resource, and/or where to spatially position the content item on a display screen with respect to the content of the resource. For example, tags associated with the resource can specify height and width dimensions for content items that are eligible for presentation with the resource, or a height/width ratio for the content item. As another example, tags associated with the resource can define a location on a display screen at which one or more content items can be presented, such as above the resource content, or to the right of the resource content.

In some implementations, content distribution systems can provide content items that are configured to overlay all or a portion of the resource content. For example, an advertisement can be displayed as partially overlaying part of a news article, and can be referred to as an overlay advertisement. In some implementations, an overlay advertisement can, at least temporarily, occupy most or all of a viewable portion of a display screen. In some implementations, a user can dismiss the overlay advertisement to view the resource content by, for example, swiping across the overlay advertisement on a touch screen device, or using a mouse to select an "x" close icon. Dismissing, or closing, the overlay advertisement causes the resource content positioned beneath the overly advertisement to be revealed to the user.

In some implementations, overlay content items (e.g., overlay advertisements) include instructions that cause the overlay content items to be rendered at a portion of the resource where the overlay content item is not displayed upon initial presentation of the resource content. In other words, the overlay content item can be rendered at a portion of the resource that is "off screen" (e.g., below the fold) before user interaction with the resource. In this way, a user's initial viewing of the resource is not disrupted by the overlay content item. As a user scrolls down to view additional portions of the resource, the overlay content item scrolls into view. As the user continues to scroll, the overlay content item moves onto the display until the entire overlay content item is visible on the display.

In some implementations, the overlay content item scrolls at a rate that is different than a scroll rate of the resource content. For example, as a user scrolls through the resource content, the overlay content item can scroll into a viewable portion of the display screen at a quicker rate than portions of the resource that were not initially displayed at the user device. Providing a different scroll rate for the overlay content item can help indicate to a user viewing the overlay content item that the overlay content item is separate from the resource. In some implementations, scrolling of the overlay content item can be stopped upon the overlay content item reaching a specified position on the display screen. For example, scrolling of the overlay content item can be halted once the overlay content item becomes fully displayed. As another example, scrolling of the overlay content item can be halted when a top edge of the overlay content item reaches a top edge of the display screen. In such scenarios, the resource content can continue to scroll in response to received user scroll inputs while the overlay content item remains stationary.

In some implementations, upon rendering a resource, a user device can generate a request for a non-overlay content item (such as a banner ad positioned along the right side of the resource) for display along with the resource. The request for the non-overlay content item can be sent to a content item distribution apparatus (e.g., an advertising system). In response to the request, the content item distribution apparatus can provide the user device with non-overlay content items. Additionally, or alternatively, the content item distribution apparatus can send the user device a request for additional information associated with the resource to determine if presentation of an overlay content item with the resource is appropriate (e.g., based on characteristics of the resource and/or user device). The additional information associated with the resource can include whether or not a resource publisher has agreed to have overlay content items displayed over the resource, and whether the resource is long enough such that the overlay content item can be overlaid over a portion of the resource that is "below the fold" (e.g., rendered at a portion of the resource that is not displayed upon initial presentation of the resource at the user device). If the resource publisher has requested that overlay content items be displayed along with the resource, and the resource is sufficiently long to allow the overlay content item to be displayed over a below the fold portion of the resource, the content item distribution apparatus provides the additional overlay content item to the user device.

In some implementations, the additional information associated with the resource is provided to the content item distribution apparatus along with a request for the non-overlay content item. In some implementations, the additional overlay content item is provided in response to the request for the non-overlay content item, and the overlay content item is only presented to a user if the user device determines that parameters of the resource and a display screen of the user device are sufficient to allow for presentation of the overlay content item.

Upon presentation of an overlay content item, the user can select a link or area of the overlay content item to receive more information associated with the overlay content item. For example, the overlay content item can be an advertisement for a brand of headphones, and include a link to a webpage containing additional information about the headphones. In this example, user interaction with the advertisement can cause the user device to be redirected to a webpage containing additional information about the headphones, and may provide an option for the user to purchase the headphones from an online retailer. As another example, the overlay content item can be an advertisement for an upcoming concert in the user's area. The user can select a link within the advertisement to be redirected to a webpage containing additional information about the concert. The user can also interact with the overlay content item by dismissing the overlay content item to view the resource by, for example, swiping across the overlay ad on a touch screen device, or using a mouse to select an "x" close icon. Dismissing, or closing, the overlay ad causes the resource positioned beneath the ad to be revealed to allow the user to continue viewing the resource.

Figure 1:
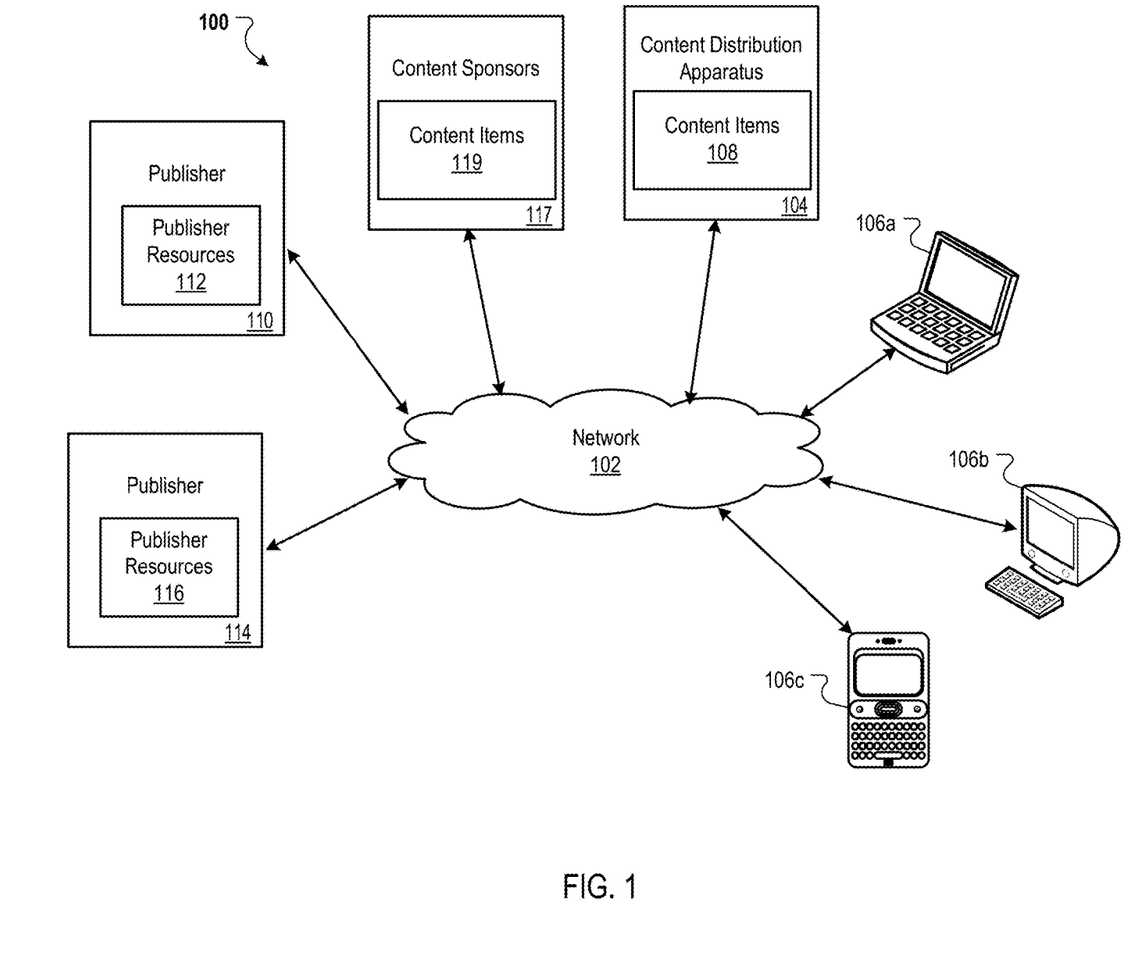
FIG. 1 is a block diagram of an example environment in which content is distributed to user devices.

FIG. 1 is a block diagram of an example environment 100 in which content is distributed to user devices 106. The example environment 100 includes a network 102, such as a local area network (LAN), a wide area network (WAN), the Internet, or a combination thereof. The network 102 connects resource publishers 110 and 114, user devices 106, a content sponsor 117 and content item distribution systems such as a content distribution apparatus 104. The example environment 100 may include many different resource publishers 110 and 114, user devices 106, and advertising networks 104.

The resource publishers can provide resources for presentation on the user devices 106. For example, the publisher 110 includes a database of resources 112 that can be provided through the network 102 to the user devices 106. In some implementations, the resources published by the resource publishers 110 and 114 can take the form of webpages containing text, pictures, graphics, embedded video, embedded audio, and other media. The resources published by the resource publishers 110 and 114 can also take the form of streaming audio, streaming video, text message updates sent to mobile devices, or other digital media.

In some implementations, each of the resource publishers 110 and 114 can be an entity that controls, manages and/or owns a collection of one or more websites. A website is one or more resources associated with a domain name and hosted by one or more servers. An example website is a collection of web pages formatted in hypertext markup language (HTML) that can contain text, images, multimedia content, and programming elements, such as scripts.

The example environment 100 can include a content distribution apparatus 104 that controls the distribution of content items to user devices 106. In some implementations, the content distribution apparatus 104 is implemented as an advertisement distribution system that distributes advertisements for advertisers. In some implementations, the content distribution apparatus 104 can distribute content items other than advertisements. For example, the content distribution apparatus 104 can be a video distribution apparatus for controlling distribution of video to user devices.

The example environment can also include one or more content sponsors (e.g., advertisers) such as the content sponsor 117 that can provide content items 119 (e.g., advertisements) to the content distribution apparatus 104 to include in a store of content items 108.

The content distribution apparatus 104 can provide content items 108 (e.g., advertisements) to user devices for display alongside a resource published by the publishers 110 and 114. The content items 108 provided by the content distribution apparatus 104 can be incorporated with the resources provided by the publishers 110 and 114 for display by the user devices 106 either at the user devices 106 or elsewhere. In some implementations, the content items 108 provided by the content distribution apparatus 104 can take the form of one or more advertisements. For example, the publisher 110 can provide a webpage configured to, when loaded by the user device 106a, request and receive an advertisement from the content distribution apparatus 104 and incorporate the advertisement into a display that includes the provided webpage.

A user device 106 is an electronic device that is capable of requesting and receiving resources over the network 102. Example user devices 106 include personal computers (e.g., the user devices 106a and 106b), mobile communication devices (e.g., the user device 106c), and other devices that can send and receive data over the network 102. A user device 106 typically includes a user application, such as a web browser, to facilitate the sending and receiving of data over the network 102.

A user device 106 can submit a resource request that requests a resource from a publisher. For example, the user device 106b can send a request through the network 102 to the publisher 114 for one or more publisher resources 116 (e.g., an article about the latest celebrity news). In turn, data representing the requested publisher resource 116 can be provided to the user device 106b for presentation by the user device 106b. The requested publisher resource 116 can be, for example, a home page of a website, a web page from a social network, a video clip, or a word processing document. The data representing the requested content item 116 can include data that cause presentation of the publisher resource 116 at the user device 106b. For example, pictures, text and graphics related to instructions for making cheese cake can be displayed on the user device 106b.

The publisher resource 116 can also include one or more tags or indicators that, when executed, cause the user device 106b to generate requests for one or more content items (e.g., advertisements) and transmit the requests to one or more content item distribution networks, such as the content distribution apparatus 104. For example, a webpage provided by the publisher 114 to the user device 106b includes tags that cause requests for three advertisements for display along with the webpage to be generated. The user device 106b can send a request for three advertisements matching the parameters specified by the webpage to the content distribution apparatus 104. The three advertisements requested can be, for example, a banner ad for presentation at the top of the webpage, a side ad for presentation along the left side of the webpage, and a scrolling interstitial ad for overlay over a portion of the resource of the webpage that is outside of a viewable portion of the webpage upon initial presentation of the webpage. In response to the request, the content distribution apparatus 104 can provide the requested advertisements 108 to the user device 106b through the network 102 for display on the user device 106b along with content of the webpage.

In some implementations, tags included in the resource provided to the user devices 106 can include data specifying content item slots. A content item slot is a portion of the resource (e.g., a portion of a web page) or a portion of a user display (e.g., a presentation location of another window or in a slot of a web page) in which content items, such as advertisements, can be presented. In some implementations, the content item slots can specify portions of a resource that are not visible upon initial presentation of the resource. For example, a content item slot can specify a spatial position for a content item that is a specified distance (e.g., 2 cm or a specified number of pixels) below a portion of the resource that is visible upon initial presentation of the resource at the user device. As described in more detail below, content items presented in such content item slots can move into a viewable portion of the display of a user device 106 in response to a scroll event initiated by user input. Content items slots can also be referred to as advertisement slots, but any type of content (e.g., content items other than advertisements) can be presented in these content item slots. In some implementations, when the user devices 106 render a resource, execution of code associated with a slot in the resource initiates a request for a content item to populate the slot. The content item request is then sent to a content item distribution system (e.g., the content distribution apparatus 104) as described in more detail below.

Figure 2:
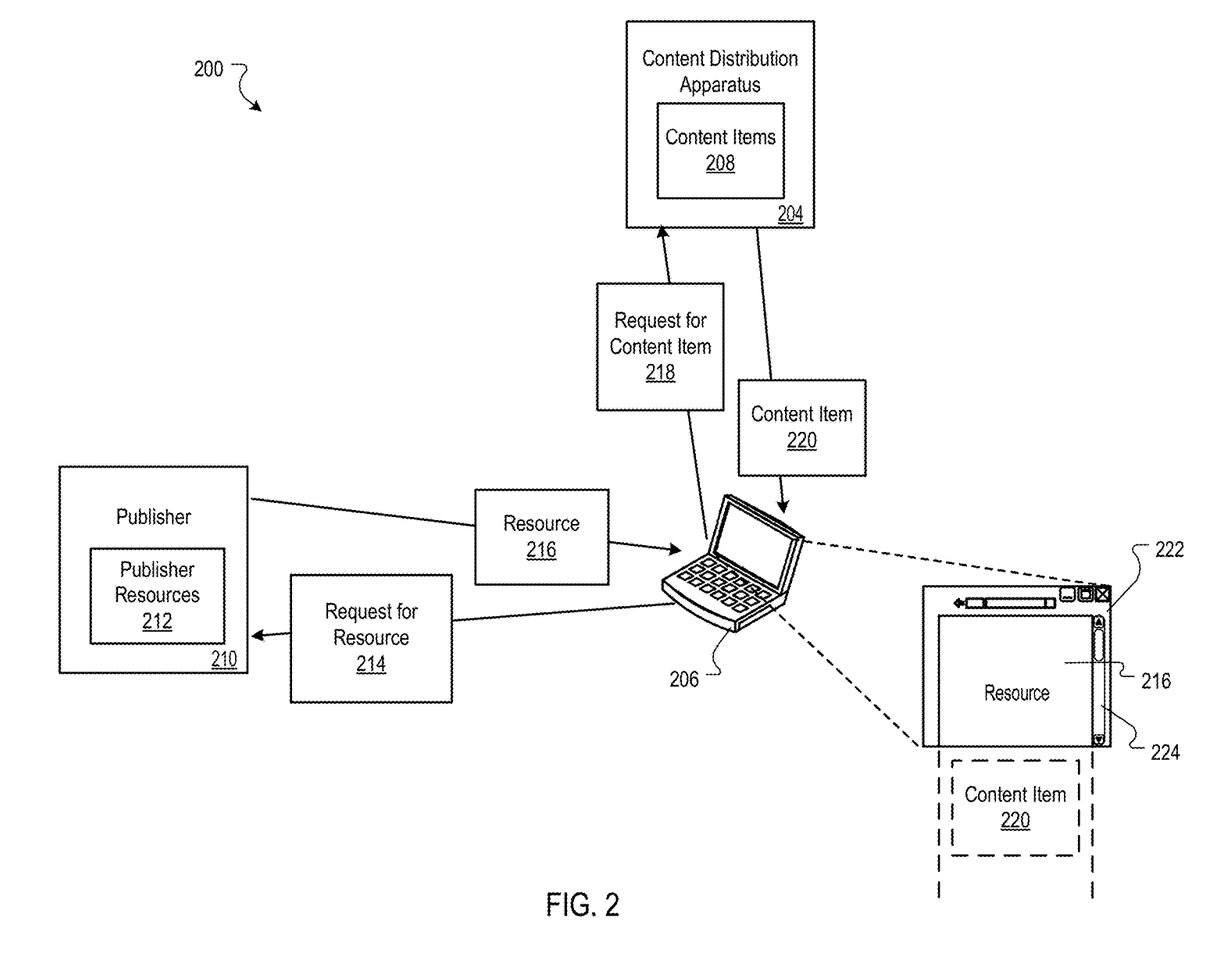
FIG. 2 is a block diagram of an example data flow for providing scrolling advertisements.

FIG. 2 is a block diagram of an example data flow 200 for providing scrolling advertisements and other content items to a user device 206. The user device 206 can be a computer such as a personal computer, a mobile telephone, a personal digital assistant (PDA), a mobile audio or video player, a game console, a Global Positioning System (GPS) receiver, a smart watch, a television set top box, or other computing device. The user device 206 is in communication with a publisher 210 and a content distribution apparatus 204 through a network, such as, for example, the network 102 of FIG. 1. The user device 206 generates a request for resource 214 and transmits the request for resource 214 to the publisher 210.

The user device 206 can initiate the request for resource 214 in response to user interaction with one or more applications running on the user device 206. For example, a user can type a URL into a search bar or destination bar of a web browser. In this example, the request for resource 214 is a request for a webpage or other content located at the URL entered by the user. As another example, the user can select a hyperlink on a webpage displayed in a browser application of the user device 206. This can cause the user device 206 to generate the request for resource 214 as a request for a webpage or other content located at an address location (e.g., URL) indicated by the selected hyperlink.

The publisher 210 receives the request for resource 214 transmitted by the user device 206 and accesses a store of publisher resources 212 (e.g., a distributed database containing webpages and other media) to identify content within the store of publisher resources 212 that matches the content indicated by the request for resource 214. For example, the publisher 210 can be a website publisher and the request for resource 214 can indicate a webpage that makes up part of the website. The publisher 210 accesses the store of publisher resources 212 to retrieve the requested webpage in response to receiving the request for resource 214. The publisher 210 then transmits requested resource 216 retrieved from the store of publisher resources 212 and transmits the resource 216 to the user device 206. For example, if the request for resource 214 is a request for a news article, the publisher 210 transmits the requested news article to the user device 206.

The user device 206 receives the resource 216 and a browser application or other application running on the user device 206 renders the resource 216 for presentation to a user of the user device 206. For example, if the resource 216 is a news article, a web browser running on the user device 206 renders the resource 216 and displays text and graphics to the user. As another example, if the resource 216 is a video file, a media player running on the user device 206 can present the video to the user.

The resource 216 can include one or more indications that cause requests for content items to be generated. For example, the resource 216 can include tags (aka, code segments) that when executed, cause the user device 206 to generate one or more requests for advertisements for presentation along with the resource 216 in specific spatial positions with respect to the resource 216 and transmit the generated requests to an content item distribution network. As another example, the resource 216 can include tags that when executed cause the user device 206 to generate one or more requests for scrolling interstitial overlay ads and transmit the requests to content item distribution network. The user device 206 can receive the resource 216 containing a code segment or other indicator that, when executed, causes the user device 206 to generate a request for a content item and transmit the request to a content item distribution network such as the content distribution apparatus 204. The user device 206 then generates a request for content item 218 and transmits the request for content item 218 to the content distribution apparatus 204. For example, the resource 216 can be a webpage, and a browser running on the user device 206 can render the webpage for presentation and generate the request for content item 218.

The request for content item 218 can be a request for one or more scrolling interstitial overlay ads. For example, the request for content item 218 can be a request for a full screen ad that is to be overlaid over a portion of the resource 216 that is "below the fold" or otherwise off screen during initial presentation of the resource. In response to receiving the request for content item 218, the content distribution apparatus 204 accesses a store of content items 208 (e.g., one or more databases of advertisements) to identify content item 220 to provide to the user device 206 in response to the request for content item 218. The content distribution apparatus 204 then provides the content item 220 to the user device 206 for display along with the resource 216.

In some implementations, the request for content item 218 includes information (e.g. content item distribution parameters) associated with the resource 216, the user device 206, and/or a user of the user device 206 that can be used by the content distribution apparatus 204 to identify one or more content items to provide in response to the request for content item 218. For example, the request for content item 218 can include keywords associated with the resource 216 to allow the content distribution apparatus 204 to identify content item 220 that is related to the resource 216. In this example, the resource 216 can be a webpage with a recipe for making lasagna, the request for content item 218 can include keywords such as "cooking," "recipes" and "lasagna." The content distribution apparatus 204 can use the indicated keywords to identify relevant content item 220.

In some implementations, the request for content item 218 can include a URL or other address indicator for the resource 216. The content distribution apparatus 204 can use the provided URL to identify one or more subject areas associated with the resource 216 (e.g., cooking) and identify content item 220 that is relevant to the identified subject areas. As another example, the request for content item 218 can include an identifier for the user device 206. The content distribution apparatus 204 can use the provided identifier to identify characteristics associated with a user (e.g., user specified interests) of the user device 206 and provide a content item 220 that has been determined to be of interest to users having similar characteristics. As yet another example, the request for content item 218 may include information relating to a general geographic area in which the user device 206 is located. For example, the request for content item 218 can specify that the user device 206 is located in Florida and the content distribution apparatus 204 can identify an advertisement for a business that operates in Florida to be provided to the user device 206 as the content item 220.

In some implementations, the request for content item 218 specifies specific dimensions or a dimension ratio for requested content item. For example, the request for content item 218 can request an advertisement having a specific height to width ratio. As another example, the request for content item 218 can specify a specific height and width (e.g., in pixels) for requested content item. In some implementations, information indicating an aspect ratio or specific dimensions for a display screen of the user device 206 is included in the request for content item 218. For example, the request for content item 218 can be a request for a scrolling overlay ad and can identify height and width dimensions for the display screen of the user device 206 to allow the content distribution apparatus 204 to identify a scrolling overlay ad that can be properly displayed on the display screen (e.g., a scrolling overlay ad having the same height/width dimensions or same aspect ratio as the display screen). As another example, the content distribution apparatus 204 can use provided screen dimension information to identify a scrolling overlay ad that will take up a majority, but not the entire display screen when presented on the display screen.

In some implementations, the request for content item 218 includes an optional request for a scrolling overlay ad. For example, the request for content item 218 can specify that a scrolling overlay ad is to be returned only if the scrolling overlay ad can be overlaid over a portion of the resource 216 that is not visible during initial presentation of the resource

216. The request for content item 218 can indicate dimensions for the display screen of the user device 206 and a length of the resource 216 (e.g., character count, word count, pixel length, etc.). The content distribution apparatus 204 can determine if the resource 216 has a sufficient length to allow a scrolling overlay ad to be positioned over a portion of the resource 216 that is out of view upon initial presentation of the resource 216. If the resource 216 has a sufficient length that enough of the resource 216 will be out of view of the display screen when the resource 216 is initially presented by the user device 206, the content distribution apparatus 204 can provide a scrolling overlay ad as the content item 220. If the resource 216 does not have a sufficient length to allow a scrolling overlay ad to be provided "below the fold" with respect to the resource 216, the content distribution apparatus 204 can return no content item, or other content item that is not a scrolling overlay ad.

In some implementations, the content distribution apparatus 204 can use dimension information for the display screen of the user device 206 and length information for the resource 216 to identify a type of scrolling overlay ad to provide as the content item 220. For example, if the resource 216 has a sufficient length to allow for a full screen scrolling overlay ad to be positioned "below the fold" of the resource 216, the content distribution apparatus 204 can provide a full screen scrolling overlay ad as the content item 220.

As another example, the content distribution apparatus 204 can determine that the resource 216 has a sufficient length to allow for a scrolling overlay ad that is less than the full dimensions of the display screen of the user device 206 but does not have a sufficient length to allow for a full screen overlay ad. In response to making this determination, the content distribution apparatus 204 can provide a less than full screen scrolling overlay ad as the content item 220. In some implementations, the content distribution apparatus 204 can use length information associated with the resource 216 to determine how much of the resource 216 will be visible to a user of the user device 206 upon initial presentation of the resource 216.

In some implementations, rather than or in addition to providing an indication of a length of the resource 216, the request for content item 218 can include a URL or address indicator for the resource 216. In some such implementations, the content distribution apparatus 204 can determine the length of the content item 220 by sending a request directly to the publisher 210, or by accessing a look up table or other memory object containing indications of content length.

In some implementations, rather than including a request for a scrolling overlay ad to be positioned "below the fold" with respect to the resource 216, the request for content item 218 can include an indication of the publisher 210 (e.g., a publisher ID) or a URL or address identifier for the resource 216. This information can be included, for example, along with a request for one or more advertisements to be displayed in specified advertising slots along with the resource 216. The content distribution apparatus 204 can use the provided indication of the publisher 210 (or provided address identifier) to identify that the resource 216 has been provided by the publisher 210. The content distribution apparatus 204 can have standing instructions from the publisher 210 to always provide a scrolling overlay ad for presentation with content provided by the publisher 210 if the content provided has a sufficient length, with respect to a display screen of a presenting user device, to allow for a scrolling overlay ad to be positioned over a portion of the provided content that is out of view during initial presentation of the provided content.

For example, the user device 206 can generate the request for content item 218 such that the request for content item 218 does not include an express request for a scrolling overlay ad, but does include a URL for the resource 216. The content distribution apparatus 204 can use the provided URL to identify the publisher 210 as the distribution network of the resource 216. The content distribution apparatus 204 can access a look up table or other memory object to see if the publisher 210 has issued a standing request for scrolling overlay ads with the content distribution apparatus 204.

If the publisher 210 has a standing request for scrolling overlay ads with the content distribution apparatus 204, the content distribution apparatus 204 can use compare information on the dimensions of the display screen of the user device 206 with length information for the resource 216 to determine if the resource 216 has a sufficient length to allow a scrolling overlay ad to be positioned over a portion of the resource 216 that is out of view when the resource 216 is initially presented by the user device 206. If the resource 216 has this sufficient length, the content distribution apparatus 204 provides a scrolling overlay ad as part or all of the content item 220. In some implementations, the request for content item 218 is a request for one or more advertisements to be positioned in specific advertisement slots during presentation of the resource 216 (e.g., a banner ad for display at the top of a webpage) and the request for content item 218 functions as an implicit request to determine if the publisher 210 has a standing request for scrolling overlay ads with the content distribution apparatus 204.

In some implementations, the user device 206 sends multiple requests for content item 218 to the content distribution apparatus 204. For example, the user device 206 can send a first ad request to the content distribution apparatus 204 requesting a banner ad for presentation in an advertisement slot to the right of the resource 216. The content distribution apparatus 204 can use the first ad request to identify the publisher 210 as the provider of the content item 220 and determine if the publisher 210 has requested scrolling overlay ads to be provided for presentation with content provided by the publisher 210. If the publisher 210 has requested that the content distribution apparatus 204 provide scrolling overlay ads, the content distribution apparatus 204 can send a first ad that is not a scrolling overlay ad (e.g., a banner ad) to the user device 206 in response to the first ad request along with a request that the user device 206 send a second ad request for a scrolling overlay ad if the resource 216 meets or exceeds specified length parameters. If the length of the resource 216 meets or exceeds length parameters specified by the content distribution apparatus 204, the user device 206 sends a second ad request for a scrolling overlay ad to the content distribution apparatus 204 and the content distribution apparatus 204 provides a scrolling overlay ad to the user device 206 in response to the second ad request. In some implementations, if the length of the resource 216 does not meet the specified length parameters, the user device 206 does not send the second ad request.

In some implementations, the publisher 210 can have a standing request for scrolling overlay ads logged with the content distribution apparatus 204, and the content distribution apparatus 204 can provide scrolling overlay ads to all user devices sending requests for content item for presentation along with content provided by the publisher 210. In some such implementations, the user devices can determine if the provided scrolling overlay ads are to be displayed along with content provided by the publisher 210. For example, the content distribution apparatus 204 can use information included in the request for content item 218 to identify the publisher 210 as the provider of the resource 216. The content distribution apparatus 204 can identify that the publisher 210 has a standing request for scrolling overlay ads to be provided for presentation along with all content provided by the publisher 210. The content distribution apparatus 204 can provide a scrolling overlay ad as all or part of the content item 220.

In some implementations, the content distribution apparatus 204 can identify a predetermined threshold length for resource items that are eligible to receive scrolling overlay ads. The content distribution apparatus 204 can determine if the resource 216 meets or exceeds the specified threshold before providing a scrolling overlay ad to the user device 206 in response to the request for content item 218. In some implementations, the threshold is determined based on a device type of the user device 206, a display type of the user device 206, display dimensions of a display of the user device 206, or an aspect ratio of a display of the user device 206. In some implementations, the content distribution apparatus 204 can compare the device display information and the publisher resource length information to identify a portion of the publisher resource that will be visible upon initial presentation of the publisher resource by the device that initiated the request.

The user device 206 receives the scrolling overlay ad and determines if the scrolling overlay ad is properly formatted for presentation along with the resource 216. For example, the user device 206 identifies a length of the resource 216, compares the length to dimension information for the display screen of the user device 206, and determines if the provided scrolling overlay ad can be positioned over a portion of the resource 216 that is out of view during initial presentation of the resource 216. If the resource 216 has a sufficient length, the user device 206 can determine that the scrolling overlay ad is to be presented along with the resource 216 in a "below the fold" manner as described in greater detail below.

The user device 206 receives the content item 220 from the content distribution apparatus 204 (e.g., through a network such as the Internet). The content item 220 can include a scrolling overlay ad as well as code segments containing instructions for presenting the scrolling overlay ad along with the resource 216. The user device 206 can display an application for presenting the resource 216 and content item 220 such as, for example, a browser 222. The browser 222 can display a portion of the resource 216 in a viewable area of the display screen of the user device 206. The content item 220 (e.g., the scrolling overlay ad) can be overlaid over a portion of the resource 216 that is outside of the viewable portion of the resource 216 during initial presentation of the resource 216. A user of the user device 206 can enter a scroll command (e.g., using a scroll bar 224 of the browser 222, or a scroll wheel of a mouse) to cause additional portions of the resource 216 to scroll into a viewable area of the display screen. As the user scrolls through the resource 216, the content item 220 scrolls into view within the browser 222. As the user continues to scroll, the content item 220 continues to scroll into view until the entire content item 220 is visible within the browser 222.

In some implementations, when the content item 220 is fully visible within the browser 222 display, the resource 216 is completely obscured by the content item 220. In some implementations, the resource 216 is partially visible when the content item 220 is fully visible. In some implementations, some or all of the content item 220 is translucent or transparent to allow portions of the resource 216 to be visible through the content item 220. Allowing a portion of the resource 216 to be visible through the content item 220 can help indicate to the user that the content item 220 is separate from the resource 216 and that the content item 220 needs to be dismissed in order to continue viewing of the resource 216. For example, the user can dismiss the content item 220 by selecting a "close" icon for the content item 220, or my making a swiping motion across the content item 220 using a touch screen of the user device 206. In some implementations, the content item 220 cannot be dismissed until a predetermined portion of the content item 220 has entered the viewable area of the browser 222. For example, the user device 206 can prevent the user from dismissing the content item 220 until all of the content item 220 is positioned within the viewable area of the browser 222. As another example, the user device 206 can prevent the user from dismissing the content item 220 until at least two thirds of the content item 220 has entered the viewable area of the browser 222.

In some implementations, the user of the user device 206 can also interact with the content item 220 by selecting portions of the content item 220 to access additional information about a product, service, event, or topic associated with or referenced by the content item 220. For example, the content item 220 can be an ad for a pickup truck. The user can select the ad to cause the browser 222 to open a webpage containing information about different models of the advertised truck and a listing of authorized dealers.

In some implementations, the content distribution apparatus 204 provides instructions along with the content item 220 that cause the content item 220 to be scrolled at a different scroll rate than the resource 216. In some implementations, the content distribution apparatus 204 can indicate a specific scroll rate for the content item 220. In some implementations, the content distribution apparatus 204 can specify a scroll rate for the content item 220 that is based on the scroll rate for the resource 216. For example, the content distribution apparatus 204 can provide instructions to the user device 206 along with the content item 220 indicating a scroll rate for the content item 220 that is 1.5 times the rate of the resource 216. As another example, the content distribution apparatus 204 can specify that the content item 220 is to be scrolled at 2 times the rate of the resource 216. In some implementations, the content distribution apparatus 204 can specify a scroll rate for the content item 220 that is slower than scroll rate for the resource 216 (for example, 0.5 times the scroll rate of the resource 216).

In response to user initiated scroll events (e.g., user interaction with the scroll bar 224), the content item 220 scrolls into the viewable portion of the browser 222 at a rate that is faster than the scroll rate of portions of the resource 216 that are initially outside of the viewable portion of the browser 222. Providing a scroll rate for the content item 220 that is different from a scroll rate for the resource 216 can indicate to the user that the content item 220 is separate from the resource 216. Providing a different scroll rate for the content item 220 can also help to draw the user's attention to the content item 220.

In some implementations, scrolling of the content item 220 can be stopped upon the content item 220 reaching a specified position within the viewable area of the browser 222. In such scenarios, the resource 216 can continue to scroll in response to scroll events initiated by the user while the content item 220 remains stationary. For example, the content item 220 can scroll into the viewable area of the browser 222 in response to one or more user initiated scroll events. Upon the content item 220 becoming fully visible within the viewable area of the browser 222, the content item 220 is no longer scrolled in response to subsequent scroll events. For example, in some such implementations, the content item 220 does not scroll back out of view in response to a "scroll down" scroll event, and does not scroll up out of the viewable area in response to a "scroll up" scroll event. As another example, scrolling of the content item 220 can be halted when a top edge of the content item 220 reaches a top edge of the browser 222. In some implementations, down scrolling of the content item 220 can be halted independently of up scrolling of the content item 220. In some implementations, the content item 220 is scrolled down in response to "scroll down" scroll events at a different rate than the content item 220 is scrolled up in response to "scroll up" scroll events.

In some implementations, the content distribution apparatus 204 can include instructions along with the content item 220 indicating where the content item 220 is to be positioned with respect to the resource 216 when the resource 216 and content item 220 are presented to the user of the user device 206. For example, the content distribution apparatus 204 can specify that a top edge of the content item 220 is to be positioned two inches (or some other distance) below a portion of the resource 216 that is viewable upon initial presentation of the resource 216. As another example, the content distribution apparatus 204 can specify a number of pixels below an initially viewable portion of the resource 216 to position a top edge of the content item 220. In some implementations, the publisher 210 can include tags or indicators in the resource 216 that specify a location within the resource 216 for positioning the content item 220 with respect to the resource 216. In some implementations, the browser 222 can be configured to always display scrolling overlay ads at a specified distance beneath a portion of the resource 216 that is visible upon initial presentation of the resource 216.

In some implementations, a position for placement of the content item 220 with respect to the resource 216 is determined partially based on identifying a portion of the resource 216 that will be visible upon initial presentation of the resource 216 by the user device 206. For example, the content distribution apparatus 204 or the user device 206 can use information indicating a length of the resource 216 and information indicating display dimensions for a viewable area of the browser 222 or for a display screen of the user device 206 to determine a portion of the resource 216 that will be visible upon initial presentation of the resource 216. A position for the content item 220 can then be selected to be a predetermined distance below the determined initially visible portion of the resource 216.

Figure 3:
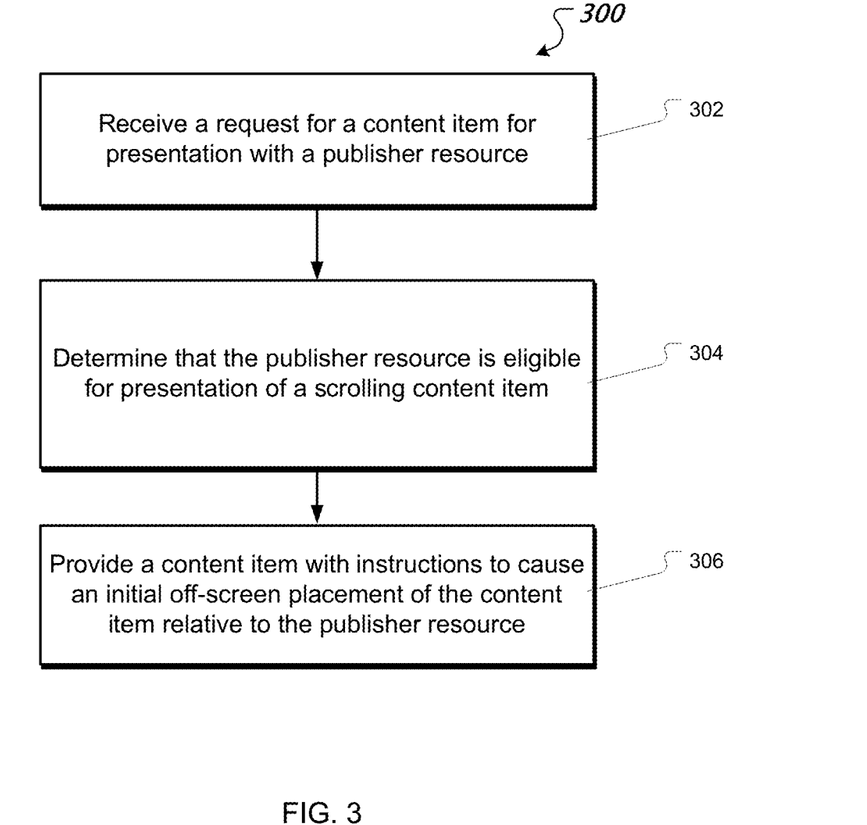
FIG. 3 is a flow chart of an example process for providing scrolling content items.

FIG. 3 is a flow chart of an example process 300 for providing scrolling content items. The process 300 can be performed by one or more data processing apparatus, such as the content distribution apparatus 104, the content distribution apparatus 204, or another data processing apparatus. Operations of the process 300 can be implemented by instructions stored on a non-transitory computer readable medium, where execution of the instructions causes one or more data processing apparatus to perform operations of the process 300.

A request for a content item for presentation with a publisher resource is received (302). The request can be received, for example, through a network such as the Internet. In some implementations, the request is received from a user device and specifies information associated with the publisher resource. Information specified by the request can include an identifier for a publisher of the publisher resource, a URL or other address identifier for the publisher resource, a length of the publisher resource, dimensions of a display screen of a device that initiated the request, an aspect ratio of a display screen of a device that initiated the request, desired dimensions or a desired dimension ratio for the requested content item, a device type identifier for a device that initiated the request, or content item distribution parameter data associated with the publisher resource.

Eligibility of the publisher resource for presentation of a scrolling content item is determined (304). For example, a content distribution apparatus (e.g., the content distribution apparatus 204) that receives the request can determine if the request includes an explicit request for a scrolling content item. As another example, the content distribution apparatus can use information provided with the request to identify a publisher of the publisher resource. The content distribution apparatus can then identify whether or not the publisher has requested that scrolling content items be provided in response to a request for content items for all eligible publisher resources. The content distribution apparatus can then identify a length of the publisher resource (e.g., using length information provided with the request, or by using a network address for the publisher resource to access the publisher resource and determine the length of the publisher resource).

The content distribution apparatus can also identify dimensions or an aspect ratio of a display screen of a device that initiated the request. For example, the content distribution apparatus can access display dimension or aspect ratio information included in the request. As another example, the content distribution apparatus can use a device type identifier to determine display dimensions or aspect ratio for devices of that type (e.g., by accessing a look up table). The content distribution apparatus can compare the display dimension or aspect ratio information for the display of the device that initiated the request to length information for the publisher resource to determine if the publisher resource is of a sufficient length to allow the requested content item to be displayed over a portion of the publisher resource that is not presented by the request initiating device upon initial presentation of the publisher source In some implementations, a determination as to whether or not a scrolling content item is returned in response to the request for a content item can be based on whether information included with the request matches content distribution parameters associated with the scrolling content items. For example, the request can include a device identifier for the device that initiated the request. A content distribution apparatus can use the information to determine if favorable responses to scrolling content items were received from the user device in the past (e.g., the user has clicked on scrolling overlay ads 30% that have been displayed at the user device) or if unfavorable responses to scrolling content items were received from the user device in the past (e.g., previously presented scrolling overlay ads were dismissed without the user clicking through). In some implementations, the content distribution apparatus can use this information to determine that scrolling content items are only to be provided to user devices that are associated with favorable responses to scrolling content items.

A content item is provided with instructions to cause an initial off-screen placement of the content item relative to the publisher resource (306). For example, the instructions that cause the content item to be inserted into the publisher resource at a location at which at least a portion of the content item is not presented by the user device upon initial presentation of the publisher resource. In some implementations, the instructions can additionally cause the content item to be inserted as an overlay relative to content of the publisher resource and to scroll at a different rate than the content of the publisher resource in response to user interaction with a resource scroll control.

For example, the content item can be a scrolling overlay ad. The scrolling overlay ad can be positioned over a portion of the publisher resource that is not viewable during initial presentation of the publisher resource. In response to one or more user initiated scroll events, additional portions of the publisher resource are scrolled into view. Additionally, the scrolling overlay ad scrolls into view in response to the user initiated scroll events at a rate that is different than the scroll rate of the publisher resource. For example, the scrolling overlay ad scrolls at 2 times the rate of the publisher resource (or another rate different that the scroll rate of the resource).

Figure 4:
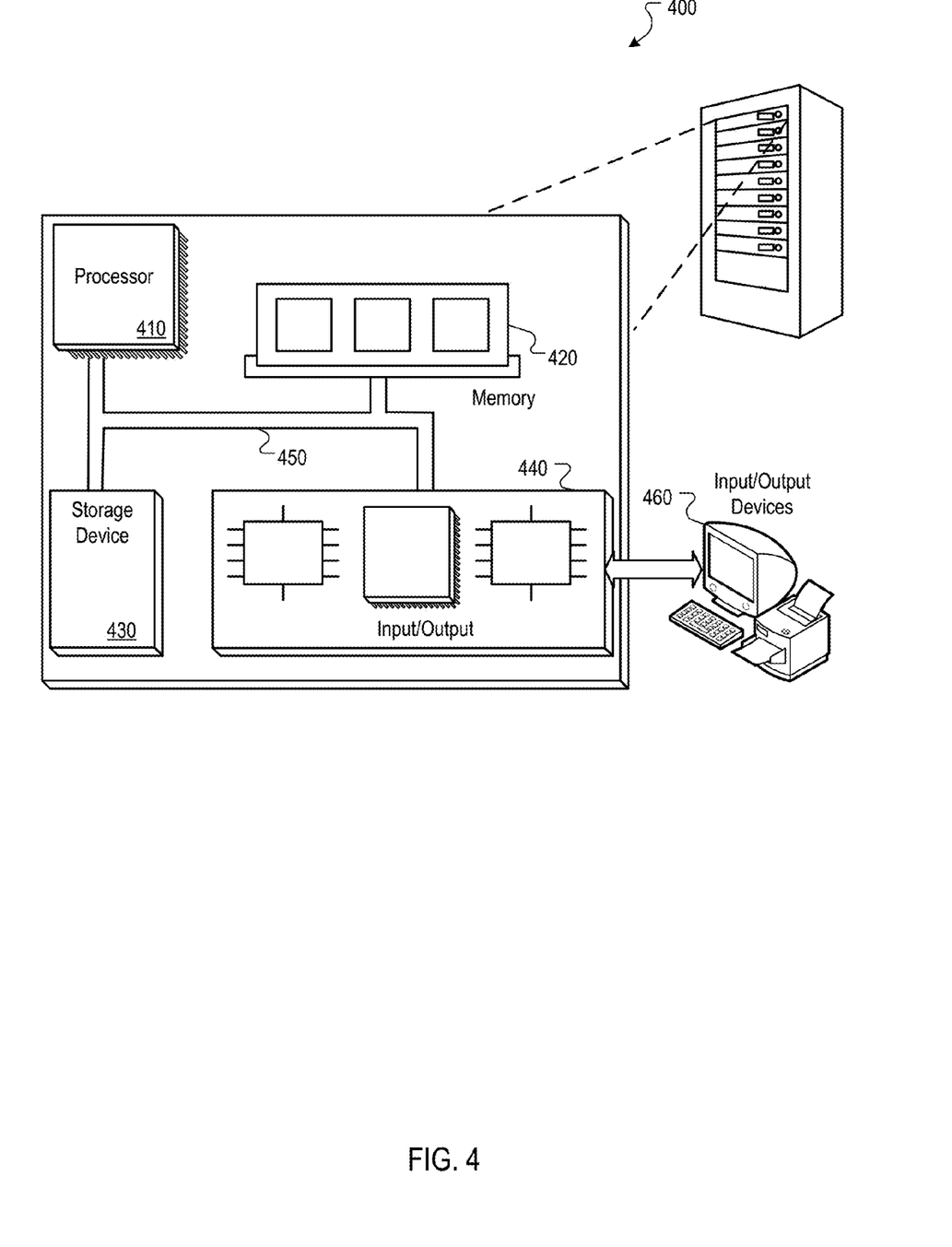
FIG. 4 is a block diagram of an example computer system.

FIG. 4 is block diagram of an example computer system 400 that can be used to perform operations described above. The system 400 includes a processor 410, a memory 420, a storage device 430, and an input/output device 440. Each of the components 410, 420, 430, and 440 can be interconnected, for example, using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 can include, for example, a hard disk device, an optical disk device, a storage device that is shared over a network by multiple computing devices (e.g., a cloud storage device), or some other large capacity storage device.

The input/output device 440 provides input/output operations for the system 400. In one implementation, the input/output device 440 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 460. Other implementations, however, can also be used, such as mobile computing devices, mobile communication devices, set-top box television client devices, etc.

Although an example processing system has been described in FIG. 4, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous

What is claimed is:

1. A method, comprising:
    receiving, from a client device, a request for content for presentation with a publisher resource, the request for content including a length of a viewable area of an application executing on the client device on which the publisher resource is displayed and a length of the publisher resource;
    determining, responsive to receiving the request for content, that the length of the publisher resource is greater than the length of the viewable area and a length of a content item to be inserted into the publisher resource;
    determining that the publisher resource is eligible for presentation of the content item based on the determination that the length of the publisher resource is greater than the length of the viewport and the length of the content item to be inserted; and providing, to the client device and in response to determining that the publisher resource is eligible, instructions that cause the client device to:

insert the content item as an overlay relative to primary content of the publisher resource at a location on the publisher resource at which an entirety of the content item is outside the viewable area of the application upon initial presentation of the publisher resource, the content item including an actionable item;

set a scroll rate of the content item faster than a scroll rate of the primary content of the publisher resource;

determine, subsequent to the initial presentation and responsive to a scroll event, that the content item moved from outside the viewable area of the application to a specified location in the publisher resource within the viewable area of the application, the specified location corresponding to an upper edge of the content item reaching an upper edge of the viewable area of the application;

maintain, responsive to the determination that the content item moved from outside the viewable area, the content item at the specified location relative to the viewable area of the application responsive to subsequent scroll events in a first scroll direction and in a second scroll direction while the underlying primary content of the publisher resource scrolls responsive to the subsequent scroll events;

determine, responsive to a detection of an interaction with the actionable item on the content item, that more than a predetermined portion of the content item is within the viewable area; and deactivate, responsive to the determination that more than the predetermined portion of the content item is within the viewable area and to the detection of the interaction with the actionable item, a visibility of the content item.

2. The method of claim 1, wherein the instructions further cause the client device to scroll into a position where the content item occludes a majority of a display of the viewable area of the application on the client device in response to user interaction with a resource scroll control.

3. The method of claim 1, wherein at least part of the primary content of the publisher resource is visible through the content item.

4. The method of claim 1, wherein the instructions further cause the client device to scroll the content item downward out of the viewable area of the application at a second scroll rate different from the primary content of the publisher resource in response to a second scroll event.

5. The method of claim 1, wherein the instructions further cause the client device to position the content item relative to the primary content of the publisher resource according to a location tag of the publisher resource identifying the location on the publisher resource not within the viewable area of the application upon the initial presentation of the publisher resource.

6. The method of claim 1, wherein the instructions further cause the client device to position the content item relative to the primary content of the publisher resource based on a determination of an amount of the primary content of the publisher resource to be displayed upon the initial presentation of the publisher resource.

7. The method of claim 1, wherein the instructions further cause the client device to position the content item at a predetermined distance below the viewable area of the application displayed upon initial presentation of the publisher resource.

8. The method of claim 7, wherein the predetermined distance is determined based in part on a size of a display of the client device.

9. The method of claim 1, wherein determining that the publisher resource is eligible for presentation of the content item includes determining that a length of the primary content of the publisher resource is greater than a predetermined threshold.

10. The method of claim 9, wherein the predetermined threshold is determined based in part on a size of a display of the client device.

11. A non-transitory computer storage medium encoded with a computer program, the program comprising first instructions that when executed by a data processing apparatus cause the data processing apparatus to perform operations, comprising:

receiving, from a client device, a request for content for presentation with a publisher resource, the request for content including a length of a viewable area of an application executing on client device on which the publisher resource is displayed and a length of the publisher resource;

determining, responsive to receiving the request for content, that the length of the publisher resource is greater than the viewable area of the application and a length of a content item to be inserted into the publisher resource;

determining that the publisher resource is eligible for presentation of the content item based on the determination that the length of the publisher resource is greater than the length of the viewable area and the length of the content item to be inserted; and providing, to the client device and in response to determining that the publisher resource is eligible, a content item with second instructions that cause the client device to:

insert the content item as an overlay relative to primary content of the publisher resource at a location on the publisher resource at which an entirety of the content item is outside the viewable area of the application upon initial presentation of the publisher resource, the content item including an actionable item;

set a scroll rate of the content item faster than a scroll rate of the primary content of the publisher resource to visually differentiate the content item from the primary content of the publisher resource;

determine, subsequent to the initial presentation and responsive to a scroll event, that the content item moved from outside the viewable area of the application to a specified location in the publisher resource within the viewable area of the application, the specified location corresponding to an upper edge of the content item reaching an upper edge of the viewable area of the application;

maintain, responsive to the determination that the content item moved from outside the viewable area, the content item at the specified location relative to the viewable area of the application responsive to subsequent scroll events in a first scroll direction and in a second scroll direction while the underlying primary content of the publisher resource scrolls responsive to the subsequent scroll events;

determine, responsive to a detection of an interaction with the actionable item on the content item, that more than a predetermined portion of the content item is within the viewable area; and deactivate, responsive to the determination that more than the predetermined portion of the content item is within the viewable area and to the detection of the interaction with the actionable item, a visibility of the content item.

12. The non-transitory computer storage medium of claim 11, wherein at least part of the primary content of the publisher resource is visible through the content item.

13. The non-transitory computer storage medium of claim 11, wherein the second instructions further cause the client device to position the content item relative to the primary content of the publisher resource based on a determination of an amount of the primary content of the publisher resource to be displayed upon the initial presentation of the publisher resource.

14. The non-transitory computer storage medium of claim 11, wherein determining that the publisher resource is eligible for presentation of the content item includes determining that a length of the content of the publisher resource is greater than a predetermined threshold.

15. A system, comprising:
a data store storing one or more content items and first instructions; and
one or more computers that interact with the data store and execute second instructions that cause the one or more computers to perform operations comprising:
receiving, from a client device, a request for content for presentation with a publisher resource, the request for content including a length of a viewable area of an application executing on the client device on which the publisher resource is displayed and a length of the publisher resource;
determining, responsive to receiving the request for content, that the length of the publisher resource is greater than the length of the viewport of the application and a length of a content item to be inserted into the publisher resource;
determining that the publisher resource is eligible for presentation of the content item based on the determination that the length of the publisher resource is greater than the length of the viewport of the application and the length of the content item to be inserted; and
providing, to the client device and in response to the request for content, the first instructions including a content item from the one or more content items, the first instructions causing the client device to:
insert the content item as an overlay relative to primary content of the publisher resource at a location at which at least which an entirety of the content item is outside the viewable area of the application upon initial presentation of the publisher resource, the content item including an actionable item;
set a scroll rate of the content item faster than a scroll rate of the primary content of the publisher resource to visually differentiate the content item from the primary content of the publisher resource;
determine, subsequent to the initial presentation and responsive to a scroll event, that the content item moved from outside the viewable area of the application to a specified location in the publisher resource within the viewable area of the application, the specified location corresponding to an upper edge of the content item reaching an upper edge of the viewable area of the application;
maintain, responsive to the determination that the content item moved from outside the viewable area, the content item at the specified location relative to the viewable area of the application responsive to subsequent scroll events in a first scroll direction and in a second scroll direction while the underlying primary content of the publisher resource scrolls responsive to the subsequent scroll events;
determine, responsive to a detection of an interaction with the actionable item on the content item, that more than a predetermined portion of the content item is within the viewable area; and
deactivate, responsive to the determination that more than the predetermined portion of the content item is within the viewable area and to the detection of the interaction with the actionable item, a visibility of the content item.

16. The system of claim 15, wherein at least part of the primary content of the publisher resource is visible through the content item.

17. The system of claim 15, wherein the first instructions further cause the client device to position the content item relative to the primary content of the publisher resource based on a determination of an amount of the content of the publisher resource to be displayed upon the initial presentation of the publisher resource.

* * * * *